(12) United States Patent
Lee et al.

(10) Patent No.: US 10,223,842 B1
(45) Date of Patent: Mar. 5, 2019

(54) SYSTEM FOR CONTROLLING REMOTELY CONNECTED VEHICLE

(71) Applicants: HYUNDAI MOTOR COMPANY, Seoul (KR); KIA MOTORS CORPORATION, Seoul (KR)

(72) Inventors: Dongchul Lee, Anyang-si (KR); In Soo Jung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/824,920

(22) Filed: Nov. 28, 2017

(30) Foreign Application Priority Data

Oct. 30, 2017 (KR) .................. 10-2017-0142551

(51) Int. Cl.
| B60K 28/00 | (2006.01) |
| G07C 5/00 | (2006.01) |
| G07C 5/08 | (2006.01) |
| H04L 29/08 | (2006.01) |
| B60W 40/09 | (2012.01) |
| G10K 15/02 | (2006.01) |

(52) U.S. Cl.
CPC ............. *G07C 5/008* (2013.01); *B60W 40/09* (2013.01); *G07C 5/0808* (2013.01); *G10K 15/02* (2013.01); *H04L 67/12* (2013.01); *G10K 2210/1282* (2013.01)

(58) Field of Classification Search
CPC ...... B60W 20/40; B60W 10/02; B60W 10/06; B60W 10/08; B60W 20/00; B60W 10/023; B60W 30/18127; B60W 20/10; B60W 10/026; B60W 30/20; B60W 10/10; B60W 10/30; B60W 20/14; B60W 30/18118; B60W 2030/02
USPC ........ 340/439, 438, 440–441, 449, 431–434, 340/450.2, 450.3, 453–454, 459, 464, 340/469, 517, 538.12, 539.24, 539.22
See application file for complete search history.

(56) References Cited

U.S. PATENT DOCUMENTS

| 6,481,271 | B1 * | 11/2002 | Ward | G01M 17/007 701/31.5 |
| 7,013,213 | B2 * | 3/2006 | McGee | B60K 6/445 701/113 |
| 2003/0088346 | A1 * | 5/2003 | Calkins | G01H 1/003 701/31.4 |
| 2008/0234964 | A1 * | 9/2008 | Miyasaka | G01H 1/003 702/113 |
| 2010/0082274 | A1 * | 4/2010 | Son | G01H 1/00 702/56 |
| 2013/0103238 | A1 * | 4/2013 | Yu | G06F 17/00 701/22 |
| 2013/0225092 | A1 * | 8/2013 | Chalmers | H04W 4/04 455/67.12 |
| 2014/0303905 | A1 * | 10/2014 | Jo | G01H 1/00 702/33 |

(Continued)

*Primary Examiner* — Daniel Previl
(74) *Attorney, Agent, or Firm* — Knobbe Martens Olson & Bear LLP (57) ABSTRACT

Disclosed is a system for controlling a vehicle using a remote artificial intelligence (AI) server. A vehicle communicates with an artificial intelligence server for noise, vibration and harshness (NVH) issue diagnosis. The vehicle controls its fuel combustion condition for improving NVH based on an NVH diagnosis result using the AI.

20 Claims, 9 Drawing Sheets

(56) References Cited

U.S. PATENT DOCUMENTS

2015/0148654 A1\* 5/2015 Whanwook ............ A61B 3/102
600/407
2017/0238505 A1\* 8/2017 Gordon ................ A01K 15/021

\* cited by examiner

SYSTEM FOR CONTROLLING REMOTELY CONNECTED VEHICLE

CROSS-REFERENCE TO RELATED APPLICATION

This application claims priority to and the benefit of Korean Patent Application No. 10-2017-0142551 filed in the Korean Intellectual Property Office on Oct. 30, 2017, the entire contents of which are incorporated herein by reference.

BACKGROUND

(a) Field

The present disclosure relates to a vehicle control total management system for diagnosing a noise, vibration and harshness (NVH) problem of a vehicle, and controlling combustion of the vehicle and a tone of the vehicle and a central artificial intelligence server connected with the vehicle control total management system via communication.

(b) Description of the Related Art

Speaker recognition (voice recognition) technology and mobile IT technology are integrated and applied to vehicles. Both technologies are used for mobile application interworking or vehicle entertainment application interworking of the vehicle through voice recognition. Specifically, both technologies are used for navigation search through voice recognition, an audio manipulation part, application manipulation through smart phone interworking, and the like.

In recent years, artificial intelligence technology has been applied to the vehicles and an application range is an operation degree of multimedia and smart devices through functions such as voice recognition, speaker recognition, motion recognition, and the like.

The above information disclosed in this background section is only for enhancement of understanding of the background of the invention. Applicant notes that this section may contain information available before this application. However, by providing this section, Applicant does not admit that any information contained in this section constitutes prior art.

SUMMARY

The present disclosure has been made in an effort to provide a vehicle control total management system for diagnosing a power train and a noise, vibration and harshness (NVH) problem of a vehicle, and controlling combustion of the vehicle and a tone of the vehicle and a central artificial intelligence server connected with the vehicle control total management system via communication.

An embodiment of the present invention provides a vehicle control total management system including: a noise sensor generating a noise data signal based on measured noise; a vibration sensor generating a vibration data signal based on measured noise; and a diagnosis unit including artificial intelligence for an NVH diagnosis by artificial intelligence (AI)-learning the noise data signal, the vibration data signal, and driving condition data and controlling a combustion condition for improving NVH based on an NVH diagnosis result using the AI.

Another embodiment of the present invention provides a central artificial intelligence server receiving NVH diagnosis results for multiple vehicles, including: a central diagnosis unit classifying the NVH diagnosis results received from the multiple vehicles for each vehicle type; and a database storing the classified NVH diagnosis results, and the central diagnosis unit may update parameter values for artificial intelligence of the multiple vehicles by learning data stored in the database.

Yet another embodiment of the present invention provides a vehicle control total management system including: a driving pattern database including data on a driving pattern and a shift pattern for each road condition and data on an acceleration pedal usage pattern of the driver for each traffic situation; and a tone control unit constructing artificial intelligence by performing AI learning by inputting the data of the driving pattern database, recognizing the driving pattern based on a road type and real-time traffic information received by using the artificial intelligence, and setting a target tone according to the recognized driving pattern.

According to embodiments of the present invention, provided are a vehicle control total management system for diagnosing a power train and a noise, vibration and harshness (NVH) problem of a vehicle, and controlling combustion of the vehicle and a tone of the vehicle and a central artificial intelligence server connected with the vehicle control total management system via communication.

DETAILED DESCRIPTION

An aspect of the present invention provides a method for controlling a vehicle remotely to obtain a desirable operating sound inside the vehicle. While the vehicle is driving, at least one sensor installed in the vehicle obtains signals representing the vehicle's status—driving speed, current location, acceleration, noise inside the vehicle cabin, vibration transferred to a driver, etc. A computing device installed in the vehicle communicates with a remote server to provide status of the vehicle. In embodiments, data representing noise inside the vehicle and/or data representing vibration of the vehicle are converted to an image and the image is transmitted to the server.

Subsequently, the server analyzes information from the vehicle and identifies at least problem associated with noise, vibration and harshness (NVH) of the vehicle. In embodiments, an image transmitted from the vehicle contains information about noise inside the vehicle and vibration of the vehicle. In embodiments, the software collects information from a plurality of vehicles other than the subject vehicle, and constructs an artificial intelligence network for diagnosing at least a problem of the subject vehicle using information from the subject vehicle (using a noise-vibration data containing image).

Subsequent to identifying an NVH problem of the vehicle, the server identifies at least one parameter for operation of the vehicle, and transmits the at least one parameter to the vehicle via wireless communication. In embodiments, the server identifies at least one fuel combustion parameter to obtain a desirable noise pattern in the vehicle, and transmits the at least one fuel combustion parameter to the vehicle. The vehicle subsequently adjust its fuel combustion using the received parameter and then captures data representing updated noise pattern (tone) in the vehicle and transmits the noise pattern data to the server such that the server can verify whether a desirable noise pattern has been accomplished in the vehicle.

A vehicle control total management system according to an embodiment checks a state of a vehicle based on a signal of a vehicle in real time, accesses an artificial intelligence system based on voice recognition, searches a destination point of a user based on a GPS location and big data, and constructs connectivity with a service center to provide information for reservation of the service center. The signal of the vehicle is a signal representing noise and vibration of the vehicle and the vehicle control total management system may determine an engine combustion state based on the signal of the vehicle.

The vehicle control total management system includes a vehicle artificial intelligence module. When the vehicle is shipped, the vehicle artificial intelligence module may be in a state in which learning is completed while satisfying a learning objective. For example, the vehicle AI module constructs an artificial intelligence network through learning of a deep learning method. The learning objective means a learning state enough to perform an NVH diagnosis based on NVH monitoring while driving, perform combustion control based on an NVH diagnosis result, and perform the combustion control so as to improve NVH by repeatedly performing the NVH monitoring.

In addition, the vehicle artificial intelligence module may construct data accumulated through repetition of the NVH monitoring, the NVH diagnosis, and the combustion control as a database or big data and learn the data by deep learning. The artificial intelligence network of the vehicle artificial intelligence module may be updated through the deep learning during operation.

Communication between a central artificial intelligence server and the vehicle control total management system is provided. Through the communication with the central artificial intelligence server, the vehicle control total management system may provide a customized customer service as well as the combustion control based on the NVH diagnosis.

In addition, the vehicle control total management system may control an indoor tone by recognizing a pattern of a driver along with a GPS and real time road conditions.

The vehicle control total management system may diagnoses real-time NVH problems, guide necessary services, control the indoor tone based on driving conditions, environmental changes, and the pattern of the driver, control driving and idle combustion characteristics to improve the NVH, and construct big data regarding a change in NVH characteristics as the database.

Hereinafter, embodiments will be described with reference to drawings.

Figure 1:
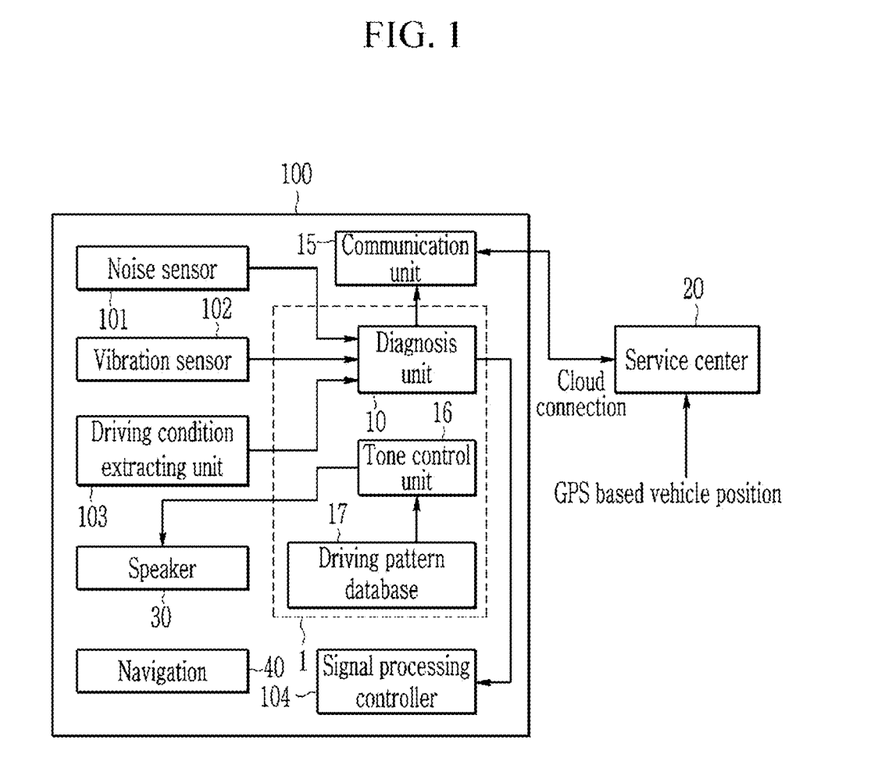
FIG. 1 is a diagram schematically illustrating a part of a vehicle control total management system according to an embodiment.

FIG. 1 is a diagram schematically illustrating a part of a vehicle control total management system according to an embodiment.

In FIG. 1, a vehicle 100 may include a vehicle control total management system 1, a communication unit 15, a speaker 30, a navigation 40, a noise sensor 101, a vibration sensor 102, a driving condition extracting unit 103, and a signal processing controller 104.

As illustrated in FIG. 1, the vehicle control total management system 1 may include a diagnosis unit 10 as a vehicle artificial intelligence module and the diagnosis unit 10 may perform learning through machine learning and include another configuration for an NVH diagnosis together.

The diagnosis unit 10 receives and collects a signal (hereinafter, referred to as a noise data signal) related to noise, a signal (hereinafter, referred to as a vibration data signal) related to vibration, and driving condition data related to NVH changed when a problem phenomenon occurs in the vehicle as big data. The diagnosis unit 10 deep-learns the collected big data and an artificial intelligence network that performs the NVH diagnosis in accordance with the noise data signal, the vibration data signal, and the driving condition data is constructed in the diagnosis unit 10. Deep learning is an example of a concrete method for implementing the machine learning and the diagnosis unit 10 according to the embodiment may construct the artificial intelligence network learned through the deep learning. However, the invention is not limited thereto, and various techniques for constructing artificial intelligence may be applied.

The noise sensor 101 measures the noise of the vehicle and generates the noise data signal by removing ambient noise. The vibration sensor 102 measures the vibration of the vehicle and generates the vibration data signal by removing the noise from the measured vibration. In FIG. 1, one noise sensor and one vibration sensor are illustrated, but this is an example for easy description. A plurality of noise sensors and vibration sensors may be provided at positions for the NVH diagnosis due to the generated noise and vibration.

The driving condition extracting unit 103 generates information on an engine RPM, a vehicle speed, an environmental condition, a vehicle driving distance durability condition, and the like.

The environmental condition as an environmental condition in which the vehicle is driven includes a temperature condition and an atmospheric condition. The temperature condition includes an outside temperature condition and an engine cooling water condition, and the outside temperature condition includes a hot condition and a cold condition (subzero condition) and the engine cooling water condition includes a hot condition (80 degrees or more) and a cold condition (80 degrees or less). The atmospheric condition includes a condition for driving the vehicle at a high ground, a condition for traveling at a sea level, and the like.

The vehicle driving distance durability condition means accumulated mileage information of the vehicle. The vehicle driving distance durability condition may be used as one of criteria for determining a degree of deterioration of durability of the vehicle.

Although the driving condition extracting unit 103 and the signal processing controller 104 are separately illustrated in FIG. 1, the signal processing controller 104 for processing information for controlling the vehicle may include the driving condition extracting unit 103.

The diagnosis unit 10 may perform a diagnosis by a diagnosis command of a driver and a speaker recognition technique for recognizing the driver may be used. A self-diagnosis of the vehicle may be performed by the diagnosis unit 10 by a command of the driver at the time of driving the vehicle. The diagnosis unit 10 may have artificial intelligence to diagnose NVH problems through artificial intelligence learning such as the deep learning.

For example, the diagnosis unit 10 may learn data input to the diagnosis unit 10 by using an artificial intelligence learning algorithm through image data processing and an artificial intelligence learning algorithm through noise and vibration data signal processing.

Raw data generated by the noise sensor, the vibration sensor, or the like, for example, the noise data signal and the vibration data signal may be converted into image data through digital signal processing. The diagnosis unit 10 may receive the image data, and perform a time domain image analysis algorithm of the image data, or perform a frequency domain image analysis algorithm of the image data by using a gabor filter. For example, if features of the image data are known when analyzing the image data on a time domain, the time domain image analysis algorithm may be performed. If the features of the image data are known when analyzing the image data on a frequency domain, the frequency domain image analysis algorithm may be performed. The invention is not limited thereto and both the time domain image analysis algorithm and the frequency domain image analysis algorithm may be applied.

In addition, the diagnosis unit 10 may perform an artificial intelligence learning algorithm for processing the raw data generated by the noise sensor, a vibration sensor, and the like. The diagnosis unit 10 may apply a signal processing feature vector based analysis algorithm to the noise and vibration data signals. For example, the diagnosis unit 10 may apply a deep neural network (DNN) treadmill technique or a convolution neural network (CNN) treadmill technique to the noise and vibration data signals.

As described above, the diagnosis unit 10 may perform the artificial intelligence learning such as the deep learning using the noise and vibration data signals and the image data thereof. However, the invention is not limited thereto, and various learning techniques applied to the machine learning may be applied to the diagnosis unit 10.

The vehicle control total management system 1 may be connected with a service center determined based on a location of the vehicle through cloud and to this end, the vehicle control total management system 1 may include the communication unit 15. The location of the vehicle may be determined by a GPS. A diagnosis result of the diagnosis unit 10 may be fed back to the cloud-connected service center through the communication unit 15. Then, a service schedule based on the diagnosis result may be reserved in the corresponding service center.

The diagnosis unit 10 may diagnose a change of a combustion characteristic of an engine and in this case, in order to maintain the NVH at an initial level before the combustion characteristic is changed, the diagnosis unit 10 may transmit an instruction for a combustion condition to the signal processing controller 104 and the signal processing controller 104 may control the engine according to the transmitted combustion condition.

The signal processing controller 104 may generate control signals for an operation of an electronic control unit for controlling the engine, a transmission, and the like. For example, the signal processing controller 104 may generate the control signal for controlling the engine in accordance with the instruction for the combustion condition received from the diagnosis unit 10. Then, an engine electronic control unit may control a combustion operation which occurs in the engine in accordance with the control signal.

As described above, the diagnosis unit 10 constructs an artificial intelligence neural network based on the noise and the vibration through the deep learning and is capable of performing a vehicle condition diagnosis (for example, NVH diagnosis) using the artificial intelligence neural network. In addition, the diagnosis unit 10 may monitor the noise data signal and the vibration data signal in real time and learn the combustion condition for improving the noise and the vibration according to the monitored noise data signal and vibration data signal by the deep learning. To this end, the diagnosis unit 10 may further receive and monitor a combustion pressure measurement result from the driving condition extracting unit 103 together with the noise data signal and the vibration data signal. Then, the diagnosis unit 10 monitors the noise data signal, the vibration data signal, and a result of a continuous pressure measurement, controls the combustion condition based on the monitored result, and deep-learns data based on the combustion condition control and the monitoring result to construct artificial intelligence for determining the combustion condition. In this process, noise data, vibration data, the combustion pressure measurement result, and the combustion condition control data are transmitted to a central artificial intelligence server 2 (see FIG. 6) to be made into the database and constructed as the big data.

Related factors to control engine combustion include a main injection timing, a fuel amount, a pilot fuel amount, rail pressure, an air amount, turbo boost, and the like. The diagnosis unit 10 may determine a target value for each of the related factors based on the determined continuous condition and transmit the target value to the signal processing controller 104.

The signal processing controller 104 may generate and transmit signals for controlling the engine electronic control unit and a transmission electronic control unit based on the target values of the related factors received from the diagnosis unit 10.

Figure 2A:
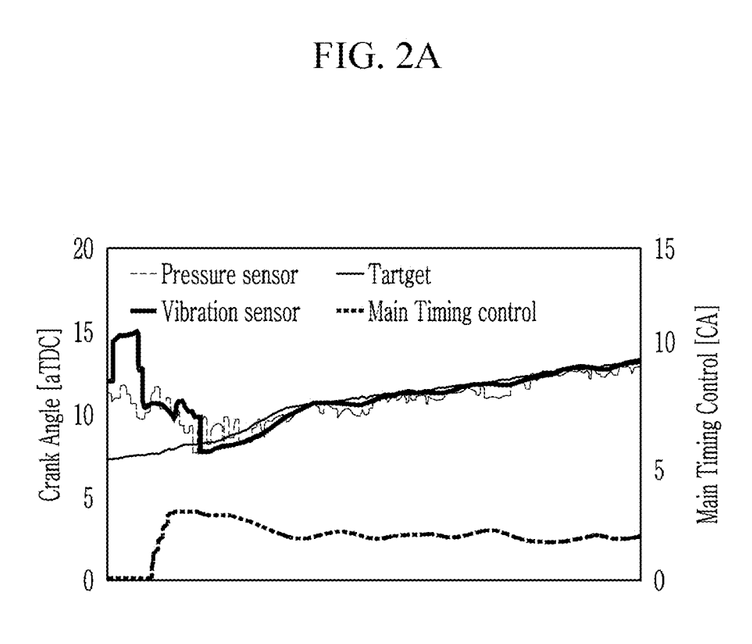
FIGS. 2A and 2B are graphs of a combustion characteristic control effect.
Figure 2B:
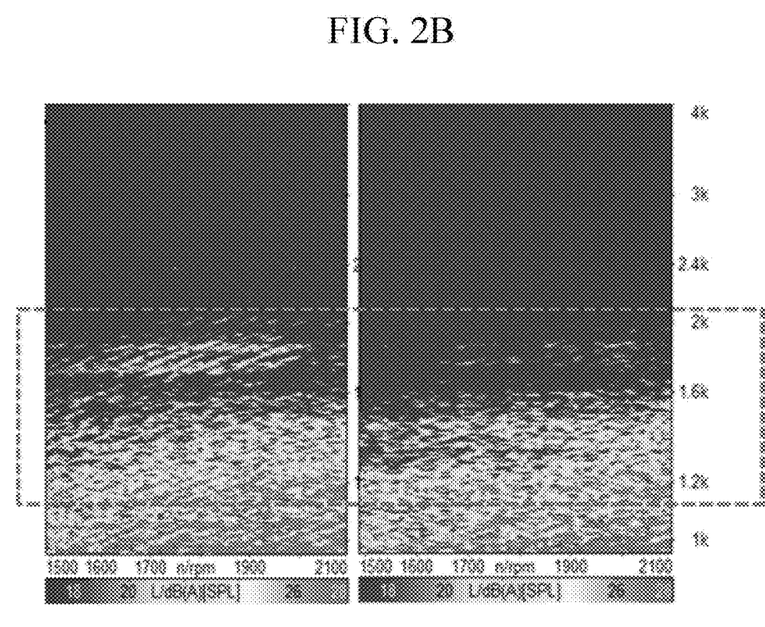

FIGS. 2A and 2B are graphs of a combustion characteristic control effect.

In FIG. 2A, main timing control means an ignition timing of the engine. The diagnosis unit 10 monitors outputs of a vibration sensor and a pressure sensor after controlling the combustion condition and the diagnosis unit 10 may control the combustion condition such as the main timing control according to the monitored result.

Then, as illustrated in FIG. 2A, the outputs of the vibration sensor and the pressure sensor may converge to the target values.

Further, a left figure of FIG. 2B illustrates an image of the noise data signal before the combustion condition control and a right figure of FIG. 2B illustrates the image of the noise data signal after the combustion condition control. As can be seen from a dotted box in FIG. 2B, it can be seen that the noise in a frequency band of approximately 1.6 k to 1.8 k is reduced.

Figure 3:
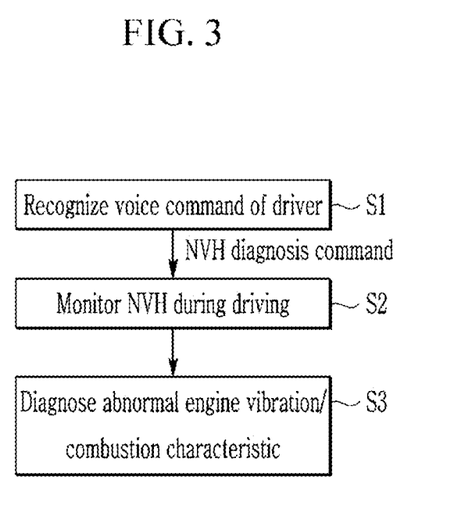
FIG. 3 is a flowchart illustrating an operation algorithm of a vehicle control total management system according to an embodiment.

FIG. 3 is a flowchart illustrating an operation algorithm of a vehicle control total management system according to an embodiment.

As illustrated in FIG. 3, a vehicle control total management system 1 recognizes a voice command of a driver who drives a vehicle (S1). However, the invention is not limited thereto, and a command through a gesture of the driver may be recognized. In the embodiment, an NVH diagnosis may be started by an NVH diagnosis voice command of the driver. In this case, only the command of the driver may be recognized after peripheral disturbance is removed by a speaker recognition artificial intelligence means of the vehicle control total management system 1. The speaker recognition artificial intelligence means may be included in the diagnosis unit 10.

When a voice command of the driver is an NVH diagnosis command, the diagnosis unit 10 starts the NVH diagnosis. First, the diagnosis unit 10 monitors NVH during driving (S2). A noise data signal, a vibration data signal, and a signal related to a driving condition transmitted from a noise sensor 101, a vibration sensor 102, and a driving condition extracting unit 103 to the diagnosis unit 10 may be used.

In the NVH monitoring step S2, only noise components may be extracted by removing environmental sound, the peripheral disturbance, and the like from the noise data signal. In this case, microphones provided in an engine room and a vehicle interior may be used for generating and filtering the noise data signal.

Further, in the NVH monitoring step S2, vibration components for main points of an engine and the vehicle may be extracted from the vibration data signal.

The diagnosis unit 10 diagnoses abnormal vibration of the engine or combustion characteristics of the engine by using artificial intelligence constructed by deep learning on the information extracted through the NVH monitor step (S3).

Figure 4:
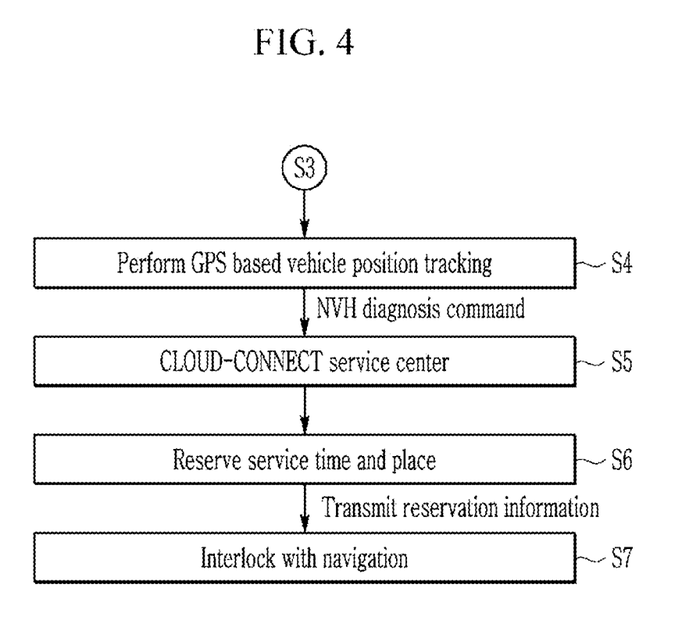
FIG. 4 is a flowchart illustrating one example of the operation algorithm of the vehicle control total management system when a diagnosis result is abnormal.

FIG. 4 is a flowchart illustrating one example of the operation algorithm of the vehicle control total management system when a diagnosis result is abnormal.

In one example illustrated in FIG. 4, when a result of the diagnosis step S3 is determined to be abnormal, vehicle tracking based on a GPS position of the vehicle is performed (S4). The vehicle tracking step S4 may be performed by a service center 20.

The vehicle control total management system 1 is connected with the service center through the communication unit 15 through the cloud (S5). The service center 20 determines the location of the vehicle and determines the time and place (for example, service center point) at which a maintenance service may be provided and makes a reservation (S6). When a reservation is completed, the service center 20 transmits reservation information (time and place) to the vehicle control total management system 1. The vehicle control total management system 1 may receive the reservation information through the communication unit 15 and the navigation 40 may interlock with the reservation information (S7).

Figure 5:
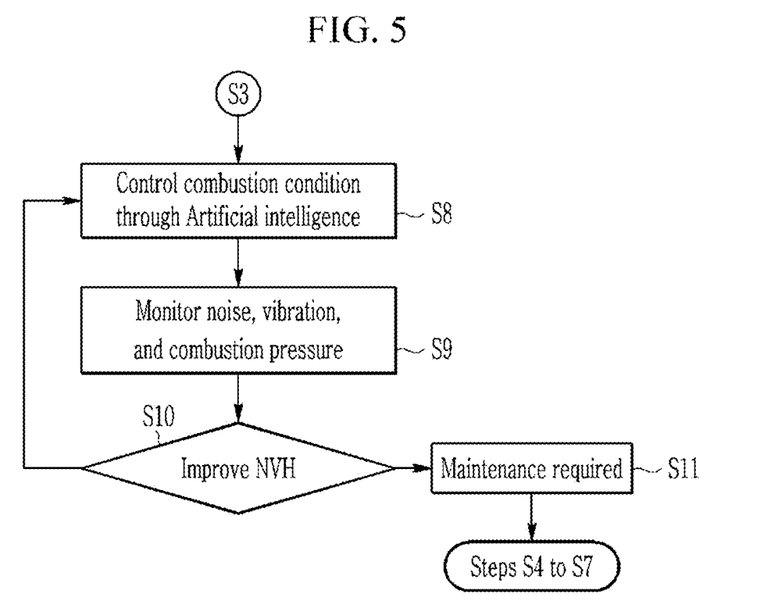
FIG. 5 is a flowchart illustrating another example of the operation algorithm of the vehicle control total management system when the diagnosis result is abnormal.

FIG. 5 is a flowchart illustrating another example of the operation algorithm of the vehicle control total management system when the diagnosis result is abnormal.

First, when it is determined that a result of the diagnosis step S3 is abnormal, the diagnosis unit 10 performs combustion condition control through artificial intelligence (S8). Next, the diagnosis unit 10 monitors a noise data signal, a vibration data signal, and a combustion pressure measurement result (S9). The diagnosis unit 10 determines whether the NVH is improved (S10) and as a result of the determination step (S10), when the NVH is improved, the diagnosis unit 10 performs the combustion condition control up to a desired NVH target value. Otherwise, it is determined that maintenance of the vehicle is required (S11). When the maintenance is required, steps S4 to S7 may be performed.

In some embodiments, NVH diagnosis is performed according to the command of the driver. However, the invention is not limited thereto, and NVH ma be periodically performed. In addition, the central artificial intelligence server 2 receives and accumulates NVH diagnosis results for multiple vehicles and the central artificial intelligence server 2 may construct a database 22 of the vehicle-specific NVH diagnosis results. Information stored in the database 22 constructed as such may be used for constructing the artificial intelligence of the diagnosis unit of each vehicle.

Figure 6:
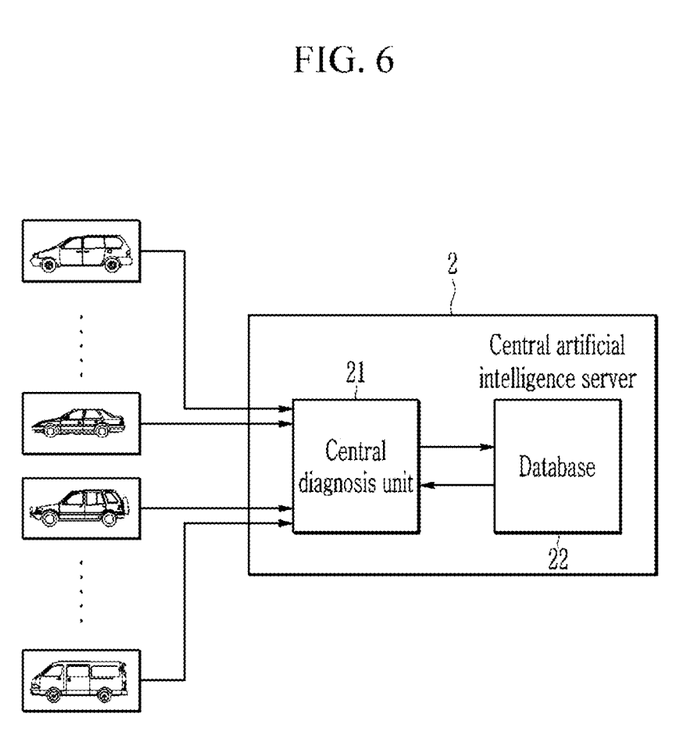
FIG. 6 is a schematic view illustrating a relationship between vehicles and a central artificial intelligence server according to an embodiment.

FIG. 6 is a schematic view illustrating a relationship between vehicles and a central artificial intelligence server according to an embodiment.

As illustrated in FIG. 6, the NVH diagnosis result may be transmitted to the central artificial intelligence server 2 for each vehicle. The central artificial intelligence server 2 may classify and store the NVH diagnosis results received from multiple vehicles for each vehicle type. Further, the central artificial intelligence server 2 may classify and store the NVH diagnosis results performed in the same vehicle in a chronological order. In this case, the NVH diagnosis performed per vehicle may be made by the command of the driver or may be performed periodically. The central artificial intelligence server 2 may make the NVH diagnosis result received from the vehicle into the database and construct the NVA diagnosis result as big data.

The central artificial intelligence server 2 may include a central diagnosis unit 21 controlling the operation as a whole and a database 22 for storing information classified from the central diagnosis unit 21.

Figure 7:
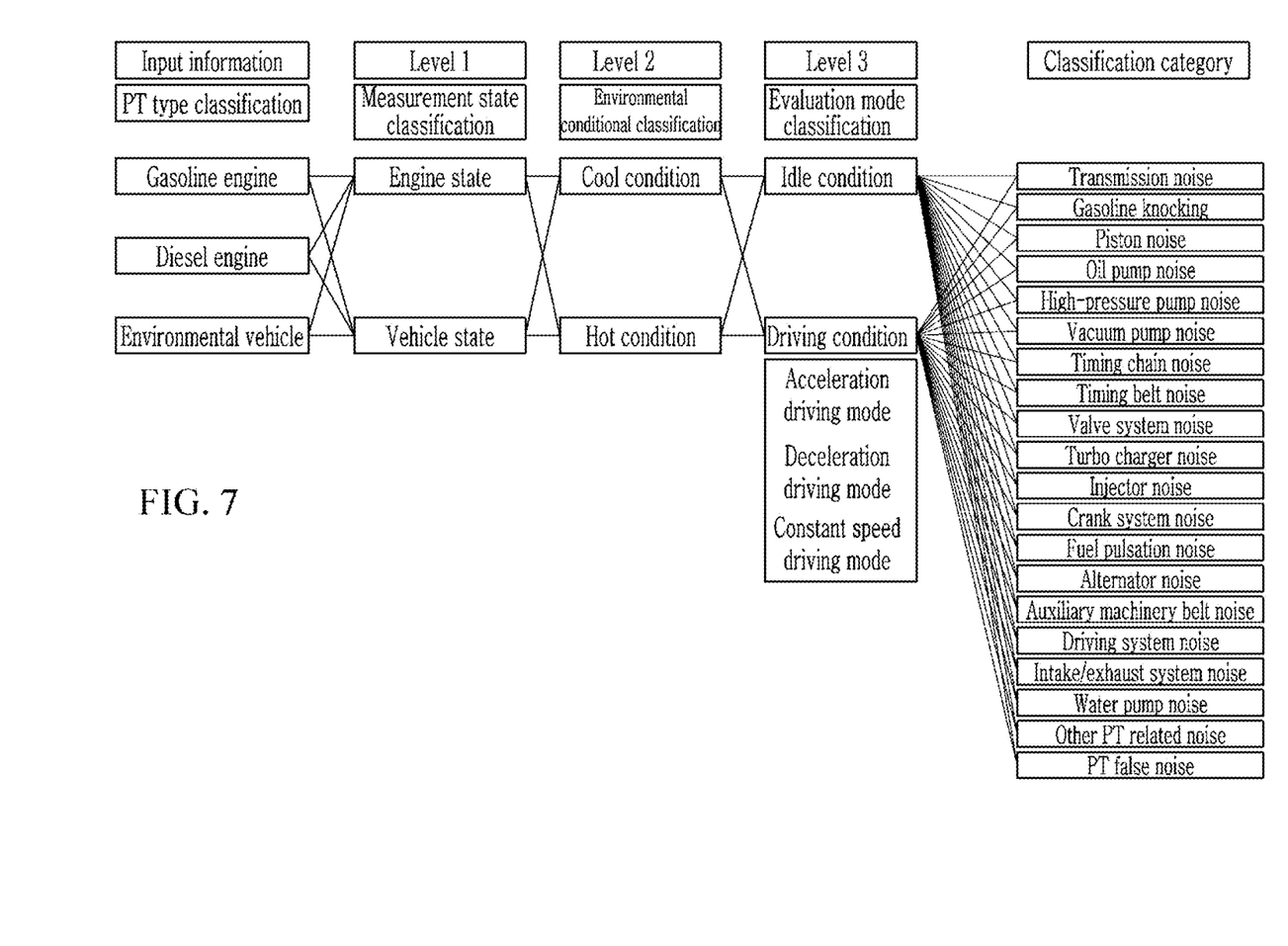
FIG. 7 is a diagram illustrating a classification category according to an NVH diagnosis result.

Categories classified through the NVH diagnosis may be represented as illustrated in FIG. 7.

FIG. 7 is a diagram illustrating a classification category according to an NVH diagnosis result.

The classification categories according to the NVH diagnosis result include transmission noise, gasoline knocking, piston noise, oil pump noise, high pressure pump noise, vacuum pump noise, timing chain noise, timing belt noise, valve system noise, turbocharger noise, injector noise, crank system noise, fuel pulsation noise, alternator noise, auxiliary machinery belt noise, driveline noise, intake/exhaust system noise, water pump noise, power train related noise, power train false noise, and the like. Input information, which is a parameter for the NVH diagnosis, includes vibration, noise, vehicle state information, and the like. The vehicle state information may be transmitted to the diagnosis unit 10 via CAN communication. In addition, the input information may include information for classifying a type of a power train as illustrated in FIG. 7. The power train may be classified into a gasoline engine vehicle, a diesel engine vehicle, an environmental vehicle, and the like. Since noise and vibration characteristics are very different depending on the power train, it is to distinguish the power train in order to perform the deep learning to be suitable for the power train. In other words, an artificial intelligence neural network needs information on the power train to accurately diagnose the NVH according to the power train.

Then, a level 1 step measurement condition classification parameter, which is a parameter required for the NVH diagnosis is a parameter for determining whether the parameter is an engine state which is noise and vibration data measured in the engine room based on a position where noise and vibration are measured or whether the parameter is a vehicle state which is noise and vibration data measured in a vehicle interior.

Next, a level 2 step environmental condition parameter, which is a parameter for the NVH diagnosis is a parameter regarding whether a temperature condition in which noise and vibration are measured is a cold condition or a hot condition. The noise characteristics vary depending on the cold and hot conditions.

Next, a level 3 step evaluation mode parameter, which is a parameter for the NVH diagnosis is a parameter regarding whether the condition is an idle condition in a stopped state, an acceleration driving mode in a driving condition which is a driving state, a deceleration driving mode, or a constant speed driving mode.

The central artificial intelligence server 2 according to a certain embodiment may update data for the NVH diagnosis according to the type of vehicle by learning data stored in the database 22. Then, the diagnosis unit may be set based on the updated data in the central artificial intelligence server 2 according to the type of vehicle. Specifically, the central diagnosis unit 21 of the central artificial intelligence server 2 learns the data stored in the database 22 by the deep learning to determine and update various parameter values for the artificial intelligence neural network and update learning logic of the diagnosis unit provided in the vehicle based on the updated parameters. In addition, the updated parameters may be transmitted to each vehicle through the central artificial intelligence server 2 so as to update the diagnosis unit of the vehicle.

The central artificial intelligence server 2 may store even the history of a personal vehicle while making a received history for each vehicle type into the database. If the diagnosis result of a specific vehicle is an anomaly diagnosis, the driver may be informed of an abnormal result and the information on the vehicle may be transmitted to a service network to provide a maintenance service and the maintenance service may be connected to the corresponding driver.

Up to now, the vehicle control total management system in which the artificial intelligence for the NVH diagnosis and improvement of the NVH diagnosis is constructed has been described. However, in the present invention, the vehicle control total management system using the artificial intelligence is not limited to the embodiment.

In the vehicle control total management system according to an embodiment, a tone control unit 16 learns a driving pattern such as a driving pattern of the driver, a shift pattern, and an acceleration pattern according to a traffic condition for a driver's road condition in a deep learning scheme to construct the artificial intelligence neural network for tone control, determine a target tone based on information on a vehicle position, a road type, and a real-time traffic situation input by using the artificial intelligence neural network, and control a tone of a vehicle speaker to the determined target tone.

Figure 8:
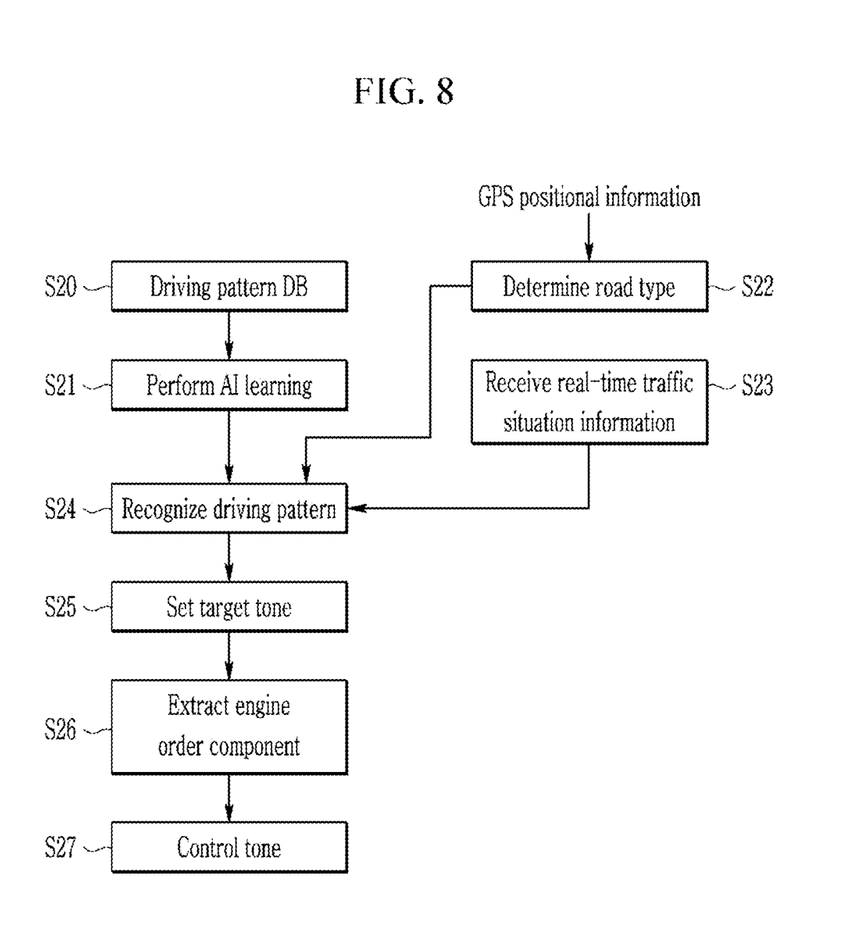
FIG. 8 is a flowchart illustrating a method in which a tone control unit controls a tone of a vehicle according to an embodiment.

FIG. 8 is a flowchart illustrating a method in which a tone control unit controls a tone of a vehicle according to an embodiment.

The vehicle control total management system 1 constructs a driving pattern database by collecting data on the driving pattern and the shift pattern for each road condition and data on an acceleration pedal usage pattern of the driver for each traffic situation (S20).

The diagnosis unit 10 performs artificial intelligence learning by inputting the data constructed in the driving pattern database 22 (S21). For example, the diagnosis unit 10 receives the data on the driving pattern and the shift pattern for each road condition and the data on an acceleration pedal usage pattern of the driver for each traffic situation and constructs an artificial neural network by deep-learning the input data.

The vehicle control total management system 1 determines the road type based on GPS-based position information (S22). The vehicle control total management system 1 accesses an ICT-based real-time traffic information server to receive traffic situation information in real time (S23).

The diagnosis unit 10 receives the road type and the real-time traffic information, and recognizes the driving pattern using the constructed artificial intelligence neural network (S24). The diagnosis unit 10 sets the target tone according to the driving pattern recognized in the driving pattern recognition step (S24).

For example, when the driving pattern is recognized as a driving pattern on a country road, the target tone may be set to emphasize a quiet tone. Alternatively, when the driving pattern is recognized as the driving pattern in a tunnel, the target tone may be set to emphasize a grand tone. Unlike this, when the driving pattern is recognized as the driving pattern on a highway, the target tone may be set to emphasize a sporty tone.

The tone control unit 16 extracts an engine order component for realizing the target tone (S26). In this case, the tone control unit 16 may receive the noise data signal generated from the engine from the noise sensor 101 and receive the vibration data signal generated from the engine from the vibration sensor 102.

Extracting the engine order component means extracting a degree and a level of the engine order component generated from the engine vibration. The engine order component is a physical phenomenon occurring in a rotating engine. For example, in the case of a six-cylinder engine, a main order component is a third component, and an engine vibration component has all engine order components rotating in the third, sixth, ninth, and twelfth components, and the like which are multiple forms based on the third component.

The tone control unit 16 controls the tone of the speaker 30 of the vehicle to match the target tone using the extracted engine order component (S27).

The tone control unit 16 may select and arrange orders that have a good effect on the tone among the extracted engine vibration order components. For example, the tone control unit 16 may select and arrange the third, fourth, 4.5-th, sixth, and eighth order components. The tone control unit 16 determines a characteristic of the engine tone by determining an amplification level of the arranged order components. The tone control unit 16 may amplify an output amplitude of the order component through signal processing. For example, the third order component may be amplified by 10 dB higher, the sixth order component may be amplified by 6 dB higher, and the eighth order component may be amplified by 3 dB higher. In this case, unlike the existing tone control technology, the tone control unit 16 according to the embodiment controls only a component between the engine order and the level which the engine vibration component has in real time to implement the engine tone.

For example, in the case of the target tone emphasizing the grand tone, the tone control unit 16 performs tone control in which engine order components in a low frequency band are emphasized. Alternatively, in the case of the target tone emphasizing the sporty tone, the tone control unit 16 performs the tone control in which an engine integer order component is emphasized.

The tone control unit 16 may generate a control signal for performing the tone control and transmit the control signal to the speaker 30. As mentioned above, the tone control unit 16 sets the arrangement and level of the engine order component for controlling the target tone among the engine order components and amplifies the engine order component and outputs the amplified engine order component to an interior acoustic device. For example, when the tone control unit 16 of vehicle A extracts only the third, sixth, and ninth components and amplifies the levels, the tone control unit 16 implements the sporty tone and when the tone control unit 16 of vehicle B extracts 2.5-th, third, 3.5-th, sixth, and 9-th components and amplifies the levels, the tone control unit 16 may implement a grand and dynamic tone. In order to maximize the tone control, a frequency filter is applied to a final output terminal of the set engine order control component to give a frequency weight.

When the road type and the real-time traffic information are changed according to the driving of the vehicle, steps is performed from step S24 again.

According to the embodiments up to now, the NVH diagnosis is possible through big data-based artificial intelligence (AI) regarding the noise and the vibration of the power train and the vehicle. Real-time diagnosis of noise and vibration phenomena which are problematic is possible and providing information on the diagnosis to customers and vehicle history management through vehicle manufacturers' cloud network are possible.

A vehicle tone control technology through the artificial intelligence (AI) may be provided by analyzing the driving pattern of the driver based on the GPS and the real-time traffic information.

The electronic control unit of the vehicle may control the engine, the transmission, and the like for improving the NVH through the durability progress of the power train and the instability recognition of the control.

It is also possible to analyze a quality problem dispersion analysis and improve service business efficiency by collecting NVH big data of mass-produced vehicles.

Further, the artificial intelligence (AI) module and the central artificial intelligence (AI) server applicable to the vehicle interlock with each other through a constructed communication network infrastructure to provide customized convenience information.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer-readable storage medium.

DESCRIPTION OF SYMBOLS

1: Vehicle control total management system
2: Central artificial intelligence server

What is claimed is:
1. A vehicle control total management system comprising:
a noise sensor configured to generate a noise data signal based on measured noise;
a vibration sensor configured to generate a vibration data signal based on measured noise; and
a diagnosis unit configured to analyze the noise data signal, the vibration data signal, and driving condition data by using artificial intelligence (AI)-learning, to diagnose a noise vibration harshness (NVH) problem of the vehicle and to control a combustion condition of the vehicle for addressing the NVH problem.

2. The vehicle control total management system of claim 1, wherein:
the diagnosis unit is configured to monitor the noise data signal, the vibration data signal, and a combustion pressure measurement result after controlling the combustion condition, and to control the combustion condition based on the monitored result, and AI-learns data based on the combustion condition control and the monitored result to construct AI for determining the combustion condition.

3. The vehicle control total management system of claim 2, wherein:
the diagnosis unit is further configured to transmit information on the noise data signal, the vibration data signal, the combustion pressure measurement result, and the combustion condition control to a central artificial intelligence server during the AI learning.

4. The vehicle control total management system of claim 1, wherein:
the diagnosis unit is further configured to constrict an artificial intelligence neural network for the NVH diagnosis by learning the noise data signal, the vibration data signal, and the driving condition data by a deep learning scheme and is further configured to perform the NVH diagnosis by the artificial intelligence neural network.

5. The vehicle control total management system of claim 4, wherein:
the diagnosis unit is further configured to covert the noise data signal and the vibration data signal into image data through digital signal processing and performs at least one of a time domain image analysis algorithm and a frequency domain image analysis algorithm by using a gabor filter with respect to the image data.

6. The vehicle control total management system of claim 4, wherein:
the diagnosis unit is further configured to apply a deep neural network (DNN) learning machine technique or a convolution neural network (CNN) learning machine technique to the noise data signal and the vibration data signal.

7. The vehicle control total management system of claim 1, further comprising:
a signal processing controller configured to control an engine, a transmission, and the like of a vehicle,
wherein the diagnosis unit is configured to transmit an instruction for the combustion condition to the signal processing controller.

8. The vehicle control total management system of claim 1, wherein:
when the NVH diagnosis result is an abnormal state, reservation information in which a maintenance service is providable is received based on a GPS position of the vehicle, and
a navigation interlocks with the reservation information.

9. The vehicle control total management system of claim 1, wherein:
classification categories according to the NVH diagnosis result include at least one selected from the group consisting of transmission noise, gasoline knocking, piston noise, oil pump noise, high pressure pump noise, vacuum pump noise, timing chain noise, timing belt noise, valve system noise, turbocharger noise, injector noise, crank system noise, fuel pulsation noise, alternator noise, auxiliary machinery belt noise, driveline noise, intake/exhaust system noise, water pump noise, power train related noise, and power train false noise.

10. The vehicle control total management system of claim 1, wherein:
parameters for the NVH diagnosis include whether the parameter is an engine state which is noise and vibration data measured in the engine room based on a position where noise and vibration are measured or whether the parameter is a vehicle state which is noise and vibration data measured in a vehicle interior, whether a temperature condition in which noise and vibration are measured is a cold or hot condition, and whether the parameter is an idle condition in a stopped state, an acceleration driving mode in a driving condition which is a driving state, a deceleration driving mode, or a constant speed driving mode.

11. A central artificial intelligence server receiving NVH diagnosis results for multiple vehicles, comprising:
a central diagnosis unit configured to classify the NVH diagnosis results received from the multiple vehicles for each vehicle type; and
a database configured to store the classified NVH diagnosis results,
wherein the central diagnosis unit configured to update parameter values for artificial intelligence of the multiple vehicles by learning data stored in the database.

12. The central artificial intelligence server of claim 11, wherein:
the central diagnosis unit is configured to determine and update parameter values for an artificial intelligence neural network by learning the data of the database by deep learning, and
wherein the server is further configured to transmit the updated parameter values to a vehicle.

13. The central artificial intelligence server of claim 11, wherein:
an abnormality result is notified to a driver of a vehicle in which the diagnosis result is abnormal among the multiple vehicles and information on the abnormal vehicle is transmitted to a service network in order to provide a maintenance service.

14. A vehicle control total management system comprising:
a driving pattern database configured to store data on a driving pattern and a shift pattern for each road condition and data on an acceleration pedal usage pattern of the driver for each traffic situation; and
a tone control unit configured to construct artificial intelligence by performing AI learning by inputting the data of the driving pattern database, recognizing the driving pattern based on a road type and real-time traffic information received by using the artificial intelligence, and configured to set a target tone according to the recognized driving pattern.

15. The vehicle control total management system of claim 14, wherein:
the tone control unit is c an artificial intelligence neural network by deep-learning the data of the database and recognizes the driving pattern based on the road type and the real-time traffic information by using the constructed artificial intelligence neural network.

16. The vehicle control total management system of claim 14, wherein:
the tone control unit is configured:
to set the target tone so as to emphasize a quiet tone when the recognized driving pattern is a country road,
to set the target tone so as to emphasize a grand tone when the recognized driving pattern is a tunnel, and
to set the target tone so as to emphasize a sporty tone when the recognized driving pattern is a highway.

17. The vehicle control total management system of claim 14, wherein:
the tone control unit is configured to determine an engine order component for the target tone and controls a speaker tone of a vehicle to match the target tone by using the extracted engine order component.

18. The vehicle control total management system of claim 17, wherein:
the tone control unit is configured to determine a grade and a level of the engine order component generated by vibration of an engine of the vehicle, and
the engine order component is a physical phenomenon occurring in a rotating engine.

19. The vehicle control total management system of claim 18, wherein the tone control unit is configured to select and arrange an order influencing the target tone among the extracted engine vibration order components,
wherein the tone control unit is configured to determine an amplification level of the arranged order component, to determine a characteristic of the engine tone, and to amplify an output amplitude of the order component through signal processing.

20. The vehicle control total management system of claim 17, wherein when the target tone emphasizes the grand tone, tone control in which the engine order component in a low-frequency band is emphasized is performed and when the target tone emphasizes the sporty tone, tone control in which an engine integer order component is emphasized is performed.

* * * * *